(12) United States Patent
Chin (10) Patent No.: US 11,275,910 B2
(45) Date of Patent: Mar. 15, 2022

(54) OBJECT IDENTIFICATION SYSTEM AND METHOD

(76) Inventor: To Chin, Hsinchu (TW)

( * ) Notice: Subject to any disclaimer, the term of this patent is extended or adjusted under 35 U.S.C. 154(b) by 28 days.

(21) Appl. No.: 14/373,279

(22) PCT Filed: Jan. 20, 2012

(86) PCT No.: PCT/CN2012/070655
§ 371 (c)(1),
(2), (4) Date: Jul. 18, 2014

(87) PCT Pub. No.: WO2013/107039
PCT Pub. Date: Jul. 25, 2013

(65) Prior Publication Data
US 2015/0123768 A1    May 7, 2015

(51) Int. Cl.
*G06K 7/10*    (2006.01)
*G06K 9/20*    (2006.01)

(52) U.S. Cl.
CPC ....... *G06K 7/10366* (2013.01); *G06K 9/2027* (2013.01)

(58) Field of Classification Search
CPC .............. A63B 2225/50; G02F 1/1336; G06K 7/10366; G06K 9/2027; G06K 7/10861; H05B 37/0272; H05B 37/0245; H04B 10/116
USPC ......................................................... 340/8.1
See application file for complete search history.

(56) References Cited

U.S. PATENT DOCUMENTS

| 2,612,994 A | 10/1952 | Woodland et al. |
| 3,935,432 A | 1/1976 | Maynard |
| 6,031,585 A * | 2/2000 | Stevens, III ...... G02F 1/133528 235/383 |
| 6,715,676 B1 * | 4/2004 | Janning .............. G06K 17/0022 235/375 |

(Continued)

FOREIGN PATENT DOCUMENTS

| CN | 101046842 A | 10/2007 |
| CN | 201111094 Y | 9/2008 |

(Continued)

*Primary Examiner* — Yong Hang Jiang (57) ABSTRACT

The present invention relates to a tag for identifying an object image, including: a feature changing module, including multiple light sources and changing intensity and a wavelength of the light source according to a feature signal; and a communication module, receiving a feature signal generated from the feature changing module, and sending an output signal related to the feature signal. The present invention further relates to a device for identifying an object image, including: a communication module, where the communication module receives a feature signal, where the feature signal includes a command or related information for controlling multiple light sources; a processing unit, where the processing unit receives the feature signal and an image signal from an image sensor, and generates an image identification result according to the image signal and the feature signal; and a storage module, used for storing the image identification result. The present invention can precisely identify an object and provide features related to the object to be identified without using a complex image identification algorithm or a technology for improving resolution of an image.

1 Claim, 8 Drawing Sheets

(56) References Cited

U.S. PATENT DOCUMENTS

| | | | | |
|---|---|---|---|---|
| 6,882,274 | B2* | 4/2005 | Richardson | G01S 5/0027 235/384 |
| 7,131,584 | B2* | 11/2006 | Stephenson | C09K 19/544 235/383 |
| 2001/0050731 | A1* | 12/2001 | An | G02B 6/0088 349/58 |
| 2004/0198555 | A1* | 10/2004 | Anderson | A63B 24/00 482/8 |
| 2006/0054695 | A1 | 3/2006 | Owada | |
| 2006/0208892 | A1* | 9/2006 | Ehrman | G06Q 10/08 340/572.1 |
| 2007/0040683 | A1 | 2/2007 | Oliver et al. | |
| 2007/0279368 | A1* | 12/2007 | Shefter | G02F 1/133615 345/102 |
| 2008/0012722 | A1* | 1/2008 | Moseley | H05B 47/105 340/12.22 |
| 2009/0231135 | A1* | 9/2009 | Chaves | G06Q 10/087 340/572.1 |
| 2011/0024500 | A1* | 2/2011 | McReynolds | G06K 17/0022 235/385 |
| 2015/0317896 | A1* | 11/2015 | Planton | G06K 19/0717 340/584 |
| 2020/0005105 | A1* | 1/2020 | Herranen | B42D 25/378 |

FOREIGN PATENT DOCUMENTS

| | | | | |
|---|---|---|---|---|
| CN | 202600754 U | * | 12/2012 | |
| EP | 1697811 B1 | * | 4/2011 | G06K 19/07703 |

* cited by examiner

OBJECT IDENTIFICATION SYSTEM AND METHOD

BACKGROUND

Technical Field

The present invention relates to an object identification system and method, and in particular, to a system and method for identifying a main target object according to a specific appearance and feature changing of the object.

Related Art

At present, technologies used for identifying objects in an image may be classified into two categories: one is to directly perform comparison by using an appearance of the object, and the other is to mark the object with a distinct tag. The technology of directly perform comparison by using an appearance of an object is affected by shooting angles, and all angles generated by features which may change must be compared when comparison is performed on the appearance, so during data processing, a considerable amount of time is consumed due to an excessively large amount of data that needs to be determined.

In addition, in a case where a tag is taken as a feature of an object, a related technology for performing comparison by using a barcode as a feature is mentioned in the United States Patent U.S. Pat. No. 2,612,994. Object features can be compared by using a rapid algorithm only if a tag has a special appearance. However, a disadvantage of a barcode is that a barcode cannot provide sufficient information because the amount of information in a barcode is too limited, and the barcode can be identified only if the image of the barcode is clear.

Furthermore, a dynamic tag technology for changing feature information of an object by color changing, provided in the United States Patent U.S. Pat. No. 3,935,432, mentions that the present prior art can provide object identification in a case where only several lamp signals are used, solving the problem in the previous prior art that features can be identified only when a high resolution image is available. However, the present prior art, still, can only provide simple numbered data and must rely on a database established in advance to find out related object information by comparing the simple numbered data with data in the database.

The United States Patent US20060054695 further proposes the technical content that a dynamic barcode is used to transmit feature information, but the disadvantage still is that a barcode can be accurately determined only if a high resolution image is available, the present prior art can only be applied in a short-distance range, and when information is transmitted by using the barcode, image transmission performed every time only includes a little bit of information and cannot effectively provide a two-way communication between a tag end and an identification end.

The Chinese Patent CN201111094 proposes that different light signal emission sources are disposed in a space and a tag automatically receives a light signal to determine a location of the tag. However, in the present prior art, each light emitting unit can only provide one unrepeatable location, and since a light signal of a greater encoding range needs a longer read time, both the usable space range and the precision of the present prior art are limited. In addition, the present prior art obtains a location of an object in a space, but the object may be covered by another object, so that the location cannot be associated with image data.

SUMMARY

The present invention provides an object identification system and method, and an interesting object may be easily identified according to a tag attached to the object.

A main objective of the present invention is to provide an object identification system which can achieve the objective of object identification by using an existing wireless communication technology and simple light changing.

The present invention provides a tag for identifying an object in image, comprising: a feature changing module, comprising one or more light sources and changing the light source according to a feature signal; and a communication module, receiving or sending a feature signal, and receiving or sending a radio signal related to the feature signal.

The present invention further provides a device for identifying an object in image, comprising: a communication module, where the communication module receives a feature signal; a processing unit, where the processing unit receives the feature signal and an image signal from an image sensor, and generates an image identification result according to the image signal and the feature signal; and a storage module, used for storing the image identification result.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

To make the foregoing features and advantages of the present invention more clear and comprehensible, specific embodiments are used as examples and are described in detail below with reference to accompanying drawings.

Figure 1:
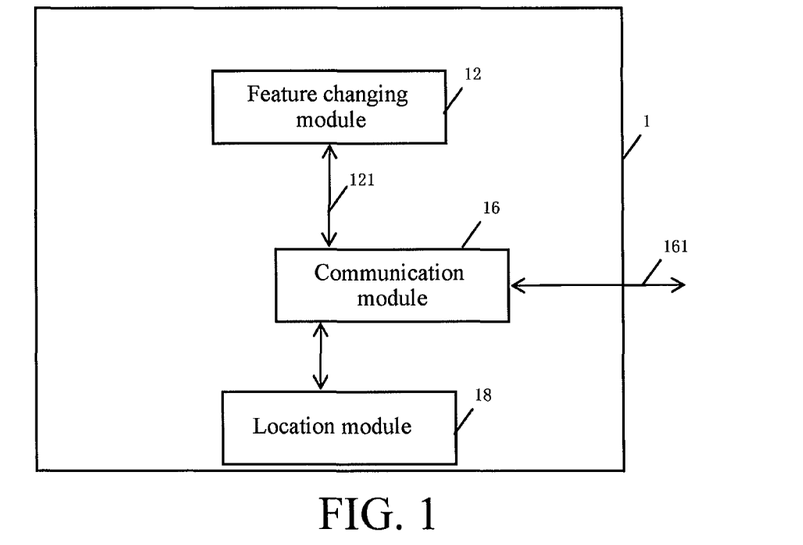
FIG. 1 is a schematic block diagram of an embodiment of a tag for identifying an object in image according to the present invention.

Referring to FIG. 1, FIG. 1 is a schematic block diagram of an embodiment of a tag for identifying an object in image according to the present invention. In FIG. 1, a tag 1 for identifying an object image may be configured on an object or a human body (not shown), where the tag 1 includes a feature changing module 12, a communication module 16 and a location module 18.

In this embodiment, the feature changing module 12 includes multiple light sources (not shown) and generates a feature signal 121, and the feature signal 121 includes a command for controlling the light sources, and the feature changing module 12 controls, according to the command included in the feature signal 121, wavelengths or intensity of the multiple light sources at a specific time. After receiving the feature signal 121, the communication module 16 properly processes the feature signal 121 and sends an output signal 161 related to the feature signal 121, where the signal 161 has information related to the command which is in the feature signal 121 and controls the multiple light sources in a light emitting module 14. The location module 18 is used for acquiring location information of the tag 1, where the location information may include but is not limited to a geographic coordinate where the tag 1 is located. The location module 18 transmits the location information to the communication module 16 and sends the location information through the communication module 16. The location module 18 may be but is not limited to a global positioning system (GPS).

In another embodiment, the communication module 16 may receive a feature signal (not shown) from the exterior of the tag 1, and transmit the feature signal to the feature changing module 12. The feature changing module 12 controls, according to the command included in the feature signal, wavelengths or intensity of the multiple light sources at a specific time.

The feature changing module 12, the communication module 16 and the location module 18 may be implemented by hardware or software, where the former has an advantage in operating speed and the latter requires a lower cost in design complexity. If hardware is used in implementation, the modules 12, 16 and 18 may be mounted in a tag 1, and the tag 1 may be a device, for example, a portable computer, a tablet computer, a mobile phone, an intelligent mobile phone, and the like. If software is used in implementation, the modules 12, 16 and 18 may include an executable program or application installed in the tag 1.

Figure 2A:
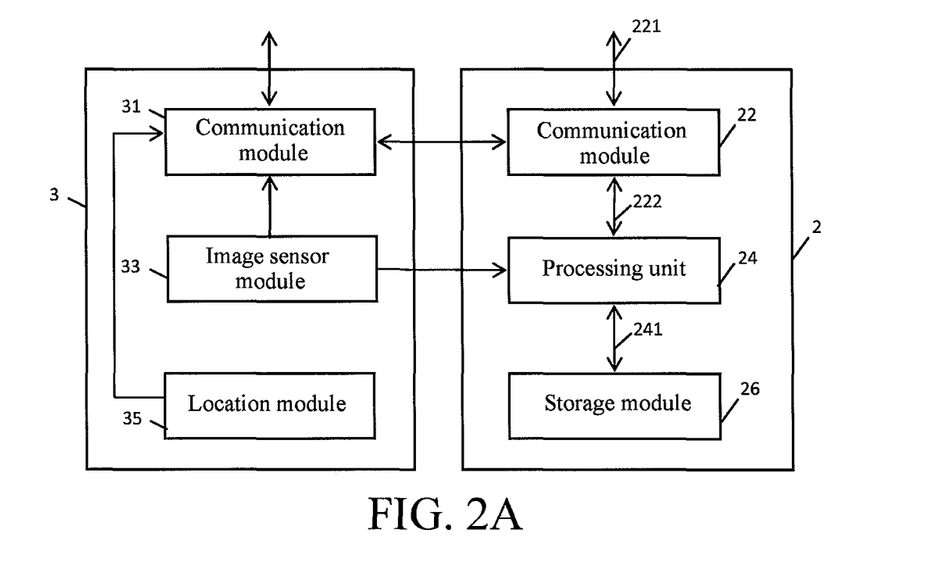
FIG. 2A is a schematic block diagram of an embodiment of a device for identifying an object in image according to the present invention.

Referring to FIG. 2A, FIG. 2A is a schematic block diagram of an embodiment of a device for identifying an object image according to the present invention. In FIG. 2A, an identification device 2 includes a communication module 22, a processing unit 24 and a storage module 26. The identification device 2 may be a computer, a server, an intelligent mobile phone, and the like.

The communication module 22 may receive a signal 221, where the signal 221 includes a command or related information controlling one or more light sources in a feature changing light emitting module. In another embodiment, the signal 221 may be the same as the signal 161 in FIG. 1. The communication module 22 receives and properly processes the signal 221, and then may obtain a signal 222 including a command or related information controlling one or more light sources in the feature changing light emitting module, and transmit the signal 222 to the processing unit 24.

FIG. 2A further includes an image sensor 3, where the image sensor 3 has a communication module 31, an image sensor module 33 and a location module 35. The image sensor module 33 may be a camera or other devices used for acquiring an image of/objects or human bodies (not shown), and the image sensor module 33 may transmit the acquired image to the processing unit 24 or transmit the acquired image through the communication modules 31 and 22 to the processing unit 24. The location module 35 is used for acquiring location information of the image sensor 33, where the location information may include but is not limited to a geographic coordinate where the image sensor 33 is located. In this embodiment, the location module 35 transmits the location information to the communication module 31 and sends the location information through the communication module 31. In another embodiment, the location module 35 transmits, through the communication modules 31 and 22, the location information of the image sensor 33 to the processing unit 24, and after receiving the location information, the processing unit 24 sends the location information to a pairing side through the communication module 22.

In an embodiment, the processing unit 24 may receive, from a pairing side through the communication module 22, a list of tags that are possibly within a sensing range of an image sensor, so as to reduce the number of tags that need to be compared.

In an embodiment, the location module 35 may be but is not limited to a global positioning system (GPS).

The processing unit 24 generates an image identification result 241 according to the image from the image sensor module 33 and the signal 222, and stores the image identification result 241 in the storage module 26.

Figure 2B:
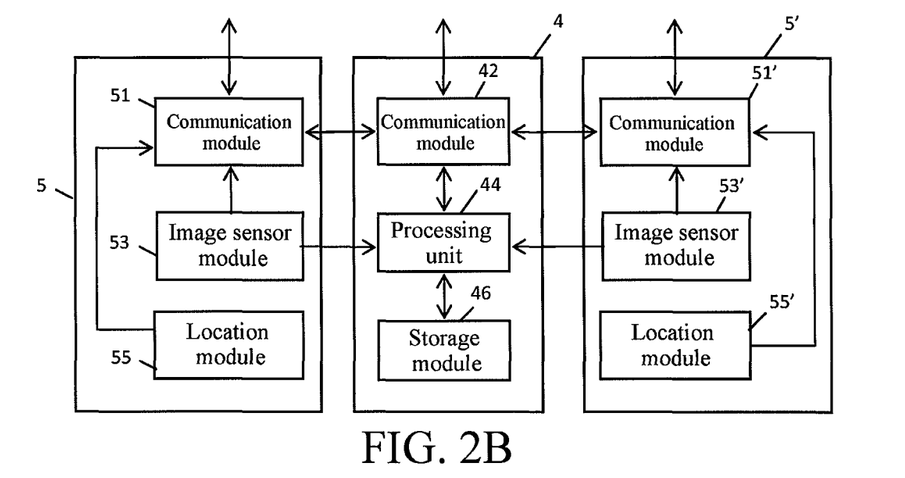
FIG. 2B is a schematic block diagram of another embodiment of a device for identifying an object in image according to the present invention.

Referring to FIG. 2B, FIG. 2B is a schematic block diagram of another embodiment of a device for identifying an object in image according to the present invention. In FIG. 2B, an identification device 4 includes a communication module 42, a processing unit 44 and a storage module 46, and an image sensor 5 includes a communication module 51, an image sensor module 53 and a location module 55. In the identification device 4, the communication module 42, the processing unit 44 and the storage module 46 are similar to the communication module 22, the processing unit 24 and the storage module 26 of the identification device 2 shown in FIG. 2A, and in the image sensor 5, the communication module 51, the image sensor module 53 and the location module 55 are similar to the communication module 31, the image sensor module 33 and the location module 35 of the image sensor 3 shown in FIG. 2A.

FIG. 2B further includes an image sensor 53', where the image sensor 53' includes a communication module 51', an image sensor module 53' and a location module 55'. In the image sensor 53', the communication module 51', the image sensor module 53' and the location module 55' are similar to the communication module 31, the image sensor module 33 and the location module 35 of the image sensor 3 shown in FIG. 2A.

Referring to FIG. 2B, in this embodiment, the processing unit 44 may receive from a pairing side through the communication module 42, a list of possible tags and feature signals of the tags belonging to the list. The location modules 55 and 55' separately send location information of the image sensors 53 and 53' to the communication modules 51 and 51', and transmit the location information to the pairing side through the communication modules 51 and 51'.

The processing unit 44 generates an image identification result according to an image from the image sensor module and a feature signal (for example, the signal 222 shown in FIG. 2A) including the command or related information controlling multiple light sources in the light emitting module, and stores the image identification result in the storage module 46. In another embodiment, the identification device 4 may also receive images and location information of multiple image sensors (not shown) other than the image sensors 53 and 53'.

Figure 3:
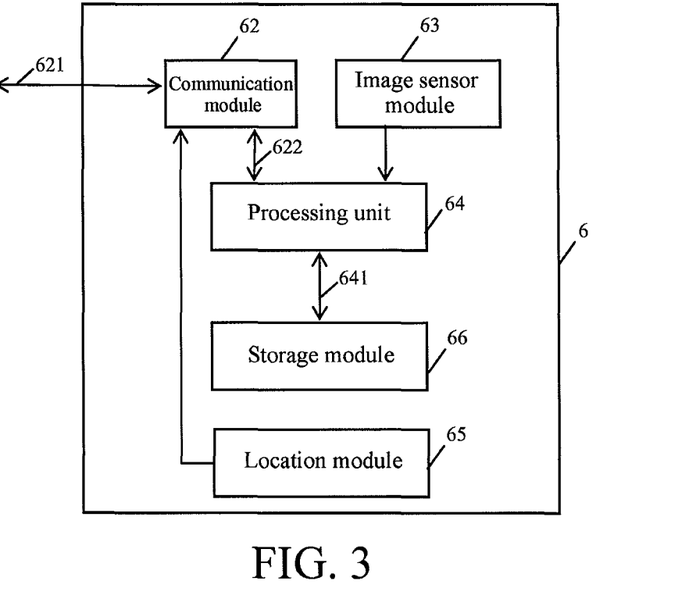
FIG. 3 is a schematic block diagram of another embodiment of a device for identifying an object in image according to the present invention.

Referring to FIG. 3, FIG. 3 is a schematic block diagram of another embodiment of a device for identifying an object in image according to the present invention. An identification device 6 includes a communication module 62, a processing unit 64, an image sensor module 63, a location module 65 and a storage module 66. The communication module 62, the processing unit 64, the image sensor module 63, the location module 65 and the storage module 66 are similar to the communication module 22, the processing unit 24, the image sensor module 33, the location module 35 and the storage module 26 that are shown in FIG. 2A, and a distinction lies in that the image sensor module 63 and the location module 65 are integrated inside the identification device 6. In another embodiment, a signal 621 may be same as the signal 221 in FIG. 2A, a signal 622 may be same as the signal 222 in FIG. 2A, and a signal 641 may be same as the signal 241 in FIG. 2A.

The communication module 62, the image sensor module 63 and the location module 65 may be implemented by hardware or software, where the former has an advantage in operating speed and the latter requires a lower cost in design complexity. If hardware is used in implementation, the modules 62, 63 and 65 may be mounted in an identification device 6, and the identification device 6 may be a device, for example, a computer, a server, a mobile phone, an intelligent mobile phone, and the like. If software is used in implementation, the modules 62, 63 and 65 may include an executable program or application installed in the identification device 6.

In an embodiment, the light source of the feature changing module is a lamp. In another embodiment, the light source of the feature changing module is pixels on a screen. In another embodiment, the light source of the feature changing module is an infra-red source.

In an embodiment, the communication modules 16, 22, 31, 42, 51, 51' and 62 are wireless radio frequency communication modules.

In another embodiment, the communication modules 16, 22, 31, 42, 51, 51' and 62 are infra-red communication modules.

In another embodiment, the communication module 16 is a wireless network module, and the communication modules 22, 31, 42, 51, 51', and 62 are network modules.

Figure 4A:
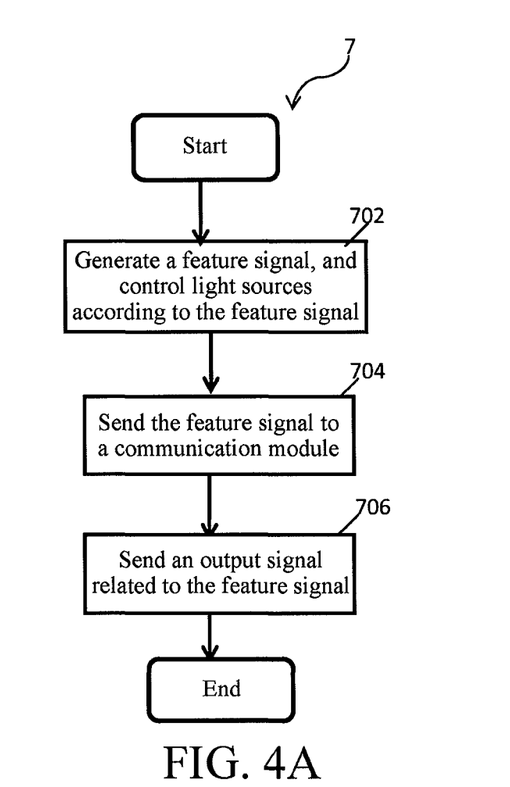
FIG. 4A is a flowchart of an embodiment of a method for identifying an object in image according to the present invention.

Referring to FIG. 4A, FIG. 4A is a flowchart of an embodiment of a method for identifying an object in image according to the present invention. In FIG. 4A, a method 7 includes the following steps and may be implemented in a tag (for example, the tag 1 shown in FIG. 1). In step 702, a feature changing module (for example, the feature changing module 12 shown in FIG. 1) may generate a feature signal, and changes a light source according to the feature signal. Subsequently, in step 704, the feature changing module transmits the feature signal to a communication module. In step 706, the communication module sends an output signal related to the feature signal.

Figure 4B:
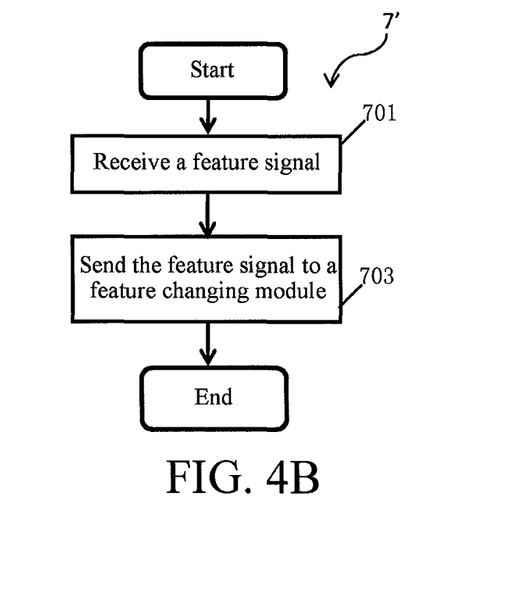
FIG. 4B is a flowchart of another embodiment of a method for identifying an object in image according to the present invention.

Referring to FIG. 4B, FIG. 4B is a flowchart of another embodiment of a method for identifying an object in image according to the present invention. In FIG. 4B, a method 7' may be implemented in a tag (for example, the tag 1 shown in FIG. 1) and the method 7' is similar to the method 7 in FIG. 4A, and a distinction lies in that the method 7' does not have step 706, and steps 702 and 704 are replaced by steps 701 and 703. In step 701, a feature changing module receives a feature signal through a communication module, and in step 703 the feature signal is transmitted to the feature changing module and a required light source changing feature signal is generated.

Figure 4C:
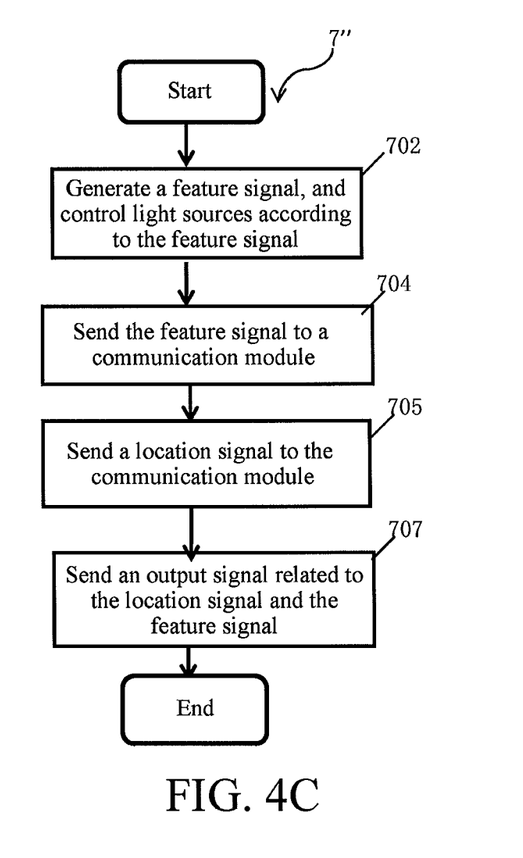
FIG. 4C is a flowchart of another embodiment of a method for identifying an object in image according to the present invention.

Referring to FIG. 4C, FIG. 4C is a flowchart of another embodiment of a method for identifying an object in image according to the present invention. In FIG. 4C, a method 7" includes the following steps and may be implemented in a tag (for example, the tag 1 shown in FIG. 1). In step 702, a feature changing module (for example, the feature changing module 12 shown in FIG. 1) may generate a feature signal and controls a light source according to the feature signal. Subsequently, in step 704, the feature changing module transmits the feature signal to a communication module. In step 705, a location module transmits a location signal of the tag to the communication module. In step 707, the communication module sends an output signal related to the feature signal and the location signal to a pairing side.

Figure 4D:
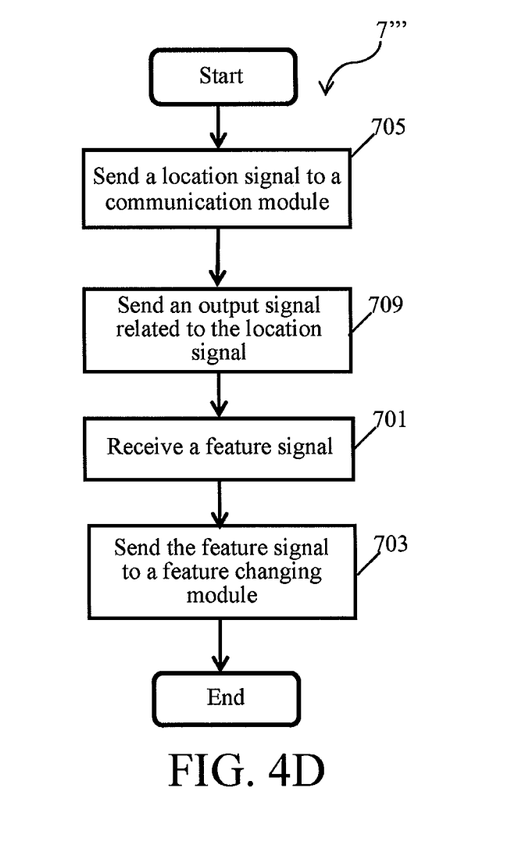
FIG. 4D is a flowchart of another embodiment of a method for identifying an object in image according to the present invention.

Referring to FIG. 4D, FIG. 4D is a flowchart of another embodiment of a method for identifying an object in image according to the present invention. In FIG. 4D, a method 7"' may be implemented in a tag (for example, the tag 1 shown in FIG. 1) and the method 7' is similar to the method 7' in FIG. 4B, and a distinction lies in that before step 701, the method 7"' includes steps 705 and 709, and in step 705, a location module transmits a location signal of the tag to a communication module. In step 709 the communication module sends an output signal related to the location signal to a pairing side.

Figure 5A:
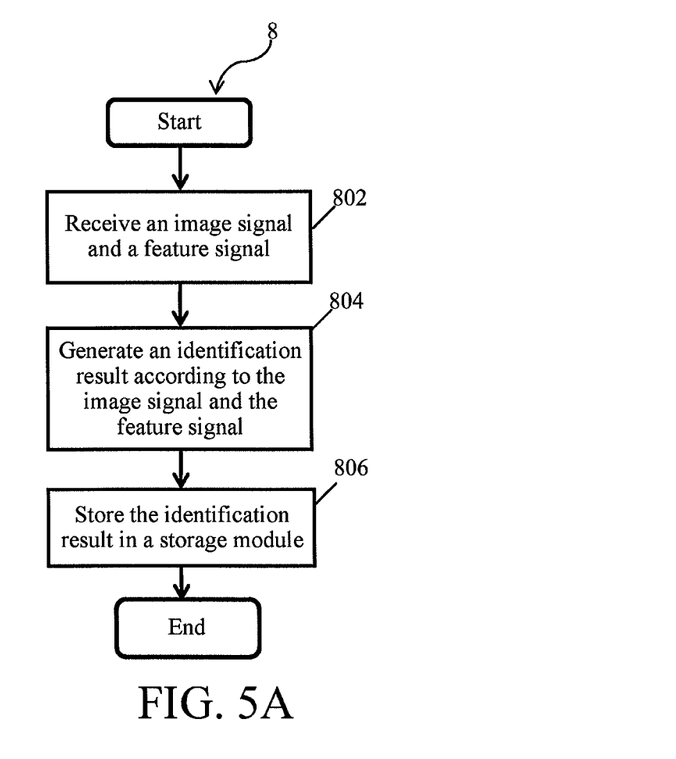
FIG. 5A is a flowchart of an embodiment of a method for identifying an object in image according to the present invention.

Referring to FIG. 5A, FIG. 5A is a flowchart of an embodiment of a method for identifying an object in image according to the present invention. In FIG. 5A, a method 8 includes the following steps and may be implemented in an identification device (for example, the identification device 2 shown in FIG. 2A). In step 802, a processing unit (for example, the processing unit 24 shown in FIG. 2A) may receive an image signal and a feature signal, where the feature signal may be similar to the signal 222 in FIG. 2A. Subsequently, in step 804, the processing unit generates an identification result according to the image signal and the feature signal. In step 806, the processing unit stores the identification result in a storage module. In another embodiment, the method 8 may also be implemented in the identification device 4 shown in FIG. 2B or the identification device 6 shown in FIG. 3.

Figure 5B:
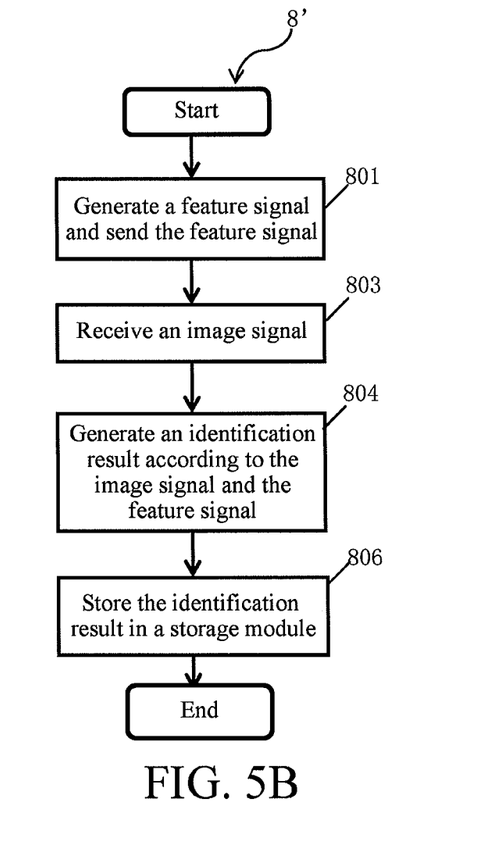
FIG. 5B is a flowchart of another embodiment of a method for identifying an object in image according to the present invention.

Referring to FIG. 5B, FIG. 5B is a flowchart of another embodiment of a method for identifying an object in image according to the present invention. In FIG. 5B, a method 8' may be implemented in an identification device (for example, the identification device 2 shown in FIG. 2A) and the method 8' is similar to the method 8 in FIG. 5A, and a distinction lies in that step 802 is replaced by steps 801 and 803. In step 801, a processing unit generates a feature signal and sends the feature signal through a communication module. In step 803, the processing unit (for example, the processing unit 24 shown in FIG. 2A) may receive an image signal. In another embodiment, the method 8' may also be implemented in the identification device 4 shown in FIG. 2B or the identification device 6 shown in FIG. 3.

Figure 5C:
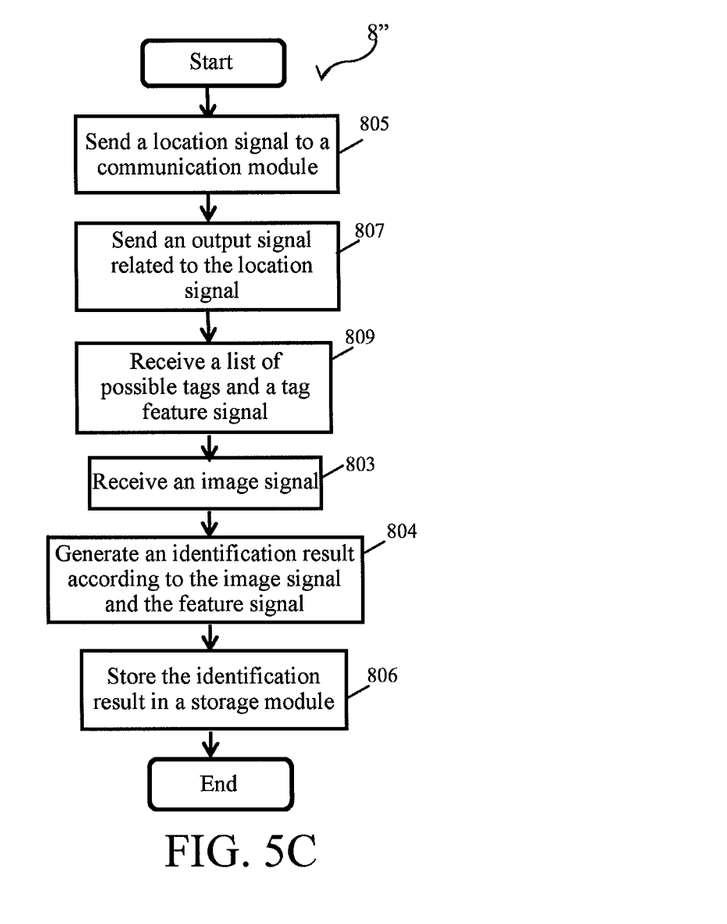
FIG. 5C is a flowchart of another embodiment of a method for identifying an object in image according to the present invention.

Referring to FIG. 5C, FIG. 5C is a flowchart of another embodiment of a method for identifying an object in image according to the present invention. In FIG. 5C, a method 8" includes the following steps and may be implemented in an identification device (for example, the identification device 4 shown in FIG. 2B) and the method 8" is similar to the method 8' in FIG. 5B, and a distinction lies in that step 801 is replaced by steps 805, 807 and 809. In step 805, a location module transmits a location signal of an image sensor module to a communication module. In step 807, the communication module sends an output signal related to the location signal. In step 809, a processing unit (for example, the processing unit 44 shown in FIG. 2B) may receive from a pairing side a list of possible tags and a tag feature signal, where the feature signal may be similar to the signal 222 in FIG. 2A.

In step 804, the processing unit generates an identification result according to the image signal and the feature signal. In step 806, the processing unit stores the identification result in a storage module.

When describing exemplary examples of the present invention, the present specification may set out the method of the present invention in specific step orders.

However, because the scope of the method is not limited to the specific step orders provided in this text, the method is not limited to the specific step orders. A person skilled in the art should understand that other step orders are also feasible. Therefore, specific step orders provided in the present specification shall not be taken as limitations to the claims. In addition, the claims related to the method of the present invention should not be implemented only according to the written step orders, and a person skilled in the art should understand that the orders may be altered and are still within the spirit and scope of the present invention.

A person skilled in the art should understand that the foregoing examples may be varied as long as such variations do not depart from the inventive concept of the present invention in the broad sense. Therefore, it should be understand that the present invention is not limited to the specific examples disclosed in the present specification, but includes modifications belonging to the spirit and scope that are defined by the following claims of the present invention.

Although the present invention is described above by using the foregoing embodiments, the present invention is not limited thereto. Any alternations and modifications made by any technical person skilled in the art without departing from the spirit and scope of the present invention shall fall within the protection scope of the present invention.

What is claimed is:

1. A device for identifying an object in an image, the device comprising:
   a communication module, wherein the communication module receives or sends a feature signal, wherein the feature signal comprises a command for controlling one or more light sources, wherein the command comprises a change and a duration of the one or more light sources;
   a processing unit, wherein the processing unit receives, from a paring side through the communication module, information of tags that are possibly located within a range of an image sensor, the information comprises feature signals that are allocated to the tags, and an image signal of the image sensor, wherein the processing unit generates identification result of one or more light sources associated with a tag from image signal;
   a storage module in communication with the processing unit for storing the identification result; and
   a location module, used for acquiring sensing location information of the image sensor, transmits the sensing location information to the communication module, and sending through the communication module the sensing location information to the pairing side.

* * * * *